United States Patent
Bansal

(10) Patent No.: US 11,359,657 B2
(45) Date of Patent: Jun. 14, 2022

(54) FITTING FOR ATTACHMENT TO A PART AND ASSOCIATED ASSEMBLY AND METHOD

(71) Applicant: The Boeing Company, Chicago, IL (US)

(72) Inventor: Amit Bansal, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 897 days.

(21) Appl. No.: 16/176,320

(22) Filed: Oct. 31, 2018

(65) Prior Publication Data

US 2020/0132097 A1  Apr. 30, 2020

(51) Int. Cl.
*F16B 39/284* (2006.01)
*F16B 5/02* (2006.01)

(52) U.S. Cl.
CPC .............. *F16B 5/02* (2013.01); *F16B 39/284* (2013.01)

(58) Field of Classification Search
CPC ........ F16B 5/02; F16B 39/284; F16B 5/0642; F16B 21/076; F16B 33/004; F16B 37/043; F16B 13/122; F16B 13/124; F16B 13/126; F16B 13/128; Y10T 29/49947

See application file for complete search history.

(56) References Cited

U.S. PATENT DOCUMENTS

| | | | |
|---|---|---|---|
| 7,993,085 B2 | 8/2011 | McClure | |
| 11,225,992 B2 * | 1/2022 | Bansal | F16B 11/006 |
| 2005/0169726 A1 | 8/2005 | McClure | |

* cited by examiner

*Primary Examiner* — Lee A Holly
(74) *Attorney, Agent, or Firm* — Kunzler Bean & Adamson

(57) ABSTRACT

Disclosed herein is a fitting for attachment to a part. The fitting comprises a body and a nut assembly. The body comprises a nut portion. The nut portion comprises a nut receptacle having a converging portion and a central axis. The nut assembly comprises a seal and a nut. The seal is within the nut receptacle, non-translatably fixed relative to the nut receptacle, and spaced apart from the converging portion. The nut is within the nut receptacle, is translatable along the central axis of the nut receptacle, and comprises resilient fingers that are resiliently deformable away from the central axis. Translation of the nut along the central axis is constrained by the converging portion and the seal.

20 Claims, 15 Drawing Sheets

FITTING FOR ATTACHMENT TO A PART AND ASSOCIATED ASSEMBLY AND METHOD

FIELD

This disclosure relates generally to part coupling techniques, and more particularly to a fitting for attachment to one or more parts to form a fitting assembly.

BACKGROUND

Fittings are commonly used to couple one part to another part. In some circumstances, accessing all sides of a part for attachment of a fitting can be difficult. Accordingly, anchors have been developed that help to couple a fitting to an exposed surface of part when direct access to a blind surface, opposite the exposed surface, is impractical. However, such top-down anchors are coupled to the fitting only as the fitting is attached to the part. Additionally, any sealing components are separately handled and assembled only as the fitting is attached to the part. Accordingly, separately handling the fitting, anchor, and sealing components leading up to and during fitting attachment process can be cumbersome and inefficient.

SUMMARY

The subject matter of the present application has been developed in response to the present state of the art, and in particular, in response to the shortcomings of conventional part-to-part fitting techniques, that have not yet been fully solved by currently available techniques. Accordingly, the subject matter of the present application has been developed to provide a fitting, fitting assembly, and associated method that overcome at least some of the above-discussed shortcomings of prior art techniques.

Disclosed herein is a fitting for attachment to a part. The fitting comprises a body and a nut assembly. The body comprises a nut portion. The nut portion comprises a nut receptacle having a converging portion and a central axis. The nut assembly comprises a seal and a nut. The seal is within the nut receptacle, non-translatably fixed relative to the nut receptacle, and spaced apart from the converging portion. The nut is within the nut receptacle, is translatable along the central axis of the nut receptacle, and comprises resilient fingers that are resiliently deformable away from the central axis. Translation of the nut along the central axis is constrained by the converging portion and the seal. The preceding subject matter of this paragraph characterizes example 1 of the present disclosure.

The nut receptacle further comprises an annular groove. The seal has an annular shape and is fitted within the annular groove. The preceding subject matter of this paragraph characterizes example 2 of the present disclosure, wherein example 2 also includes the subject matter according to example 1, above.

The seal has a triangular cross-sectional shape. The preceding subject matter of this paragraph characterizes example 3 of the present disclosure, wherein example 3 also includes the subject matter according to example 2, above.

The seal is made of an elastomeric resiliently-flexible material. The preceding subject matter of this paragraph characterizes example 4 of the present disclosure, wherein example 4 also includes the subject matter according to any one of examples 1-3, above.

The nut receptacle further comprises a first anti-rotation feature. The nut further comprises a second anti-rotation feature. Engagement between the first anti-rotation feature and the second anti-rotation feature prevents rotation of the nut relative to the nut receptacle and allows translational movement of the nut relative to the nut receptacle. The preceding subject matter of this paragraph characterizes example 5 of the present disclosure, wherein example 5 also includes the subject matter according to any one of examples 1-4, above.

The nut receptacle has a circular cross-sectional shape. The first anti-rotation feature comprises a rib extending parallel to the central axis of the nut receptacle. The second anti-rotation feature comprises a groove. The preceding subject matter of this paragraph characterizes example 6 of the present disclosure, wherein example 6 also includes the subject matter according to example 5, above.

The body further comprises a riser portion that protrudes from the nut portion and comprises a second aperture. The second aperture has a central axis that is parallel with the central axis of the nut receptacle. An entirety of the riser portion and the nut portion form a one-piece, seamless, monolithic construction. The preceding subject matter of this paragraph characterizes example 7 of the present disclosure, wherein example 7 also includes the subject matter according to any one of examples 1-6, above.

The nut portion further comprises a plurality of nut receptacles. The fitting further comprises a plurality of nut assemblies each corresponding with a respective one of the plurality of nut receptacles. The nut portion further comprises an extender bridge between a first nut-assembly-receptacle set, comprising at least two of the plurality of nut receptacles and at least two of the plurality of nut assemblies, and a second nut-assembly-receptacle set, comprising at least two of the plurality of nut receptacles and at least two of the plurality of nut assemblies. The preceding subject matter of this paragraph characterizes example 8 of the present disclosure, wherein example 8 also includes the subject matter according to any one of examples 1-7, above.

The body further comprises a riser portion that protrudes from the extender bridge and comprises a second aperture. The preceding subject matter of this paragraph characterizes example 9 of the present disclosure, wherein example 9 also includes the subject matter according to example 8, above.

The riser portion is located at a mid-point between the first nut-assembly-receptacle set and the second nut-assembly-receptacle set. The preceding subject matter of this paragraph characterizes example 10 of the present disclosure, wherein example 10 also includes the subject matter according to example 9, above.

The riser portion is located closer to the first nut-assembly-receptacle set than the second nut-assembly-receptacle set. The preceding subject matter of this paragraph characterizes example 11 of the present disclosure, wherein example 11 also includes the subject matter according to any one of examples 9-10, above.

The body further comprises a riser portion that protrudes from the nut portion and comprises a second aperture. The first nut-assembly-receptacle set is between the second nut-assembly-receptacle set and the riser portion. The preceding subject matter of this paragraph characterizes example 12 of the present disclosure, wherein example 12 also includes the subject matter according to example 8, above.

The nut portion further comprises at least one flange protruding from the extender bridge. The at least one flange comprises a plurality of apertures. The preceding subject matter of this paragraph characterizes example 13 of the present disclosure, wherein example 13 also includes the subject matter according to any one of examples 8-12, above.

An entirety of the nut portion has a one-piece, seamless, monolithic construction. The preceding subject matter of this paragraph characterizes example 14 of the present disclosure, wherein example 14 also includes the subject matter according to example 13, above.

Further disclosed herein is a fitting assembly. The fitting assembly comprises a fitting comprising a body and a nut assembly. The body comprises a nut portion and the nut portion comprises a nut receptacle having a converging portion and a central axis. The fitting assembly also comprises a nut assembly comprising a seal within the nut receptacle, non-translatably fixed relative to the nut receptacle, and spaced apart from the converging portion. The nut assembly also comprises a nut within the nut receptacle and comprising resilient fingers that are resiliently deformable away from the central axis. The fitting assembly further comprises at least one first part. The fitting assembly additionally comprises a first fastener passing through the at least one first part and secured within the nut and causing the resilient fingers to deform away from the central axis. The nut is translatable along the central axis of the nut receptacle, with translation of the nut along the central axis being constrained by the converging portion and the seal, without the first fastener passing through the nut. The preceding subject matter of this paragraph characterizes example 15 of the present disclosure.

The body further comprises a riser portion that protrudes from the nut portion and comprises a second aperture. The second aperture has a central axis that is parallel with the central axis of the nut receptacle. An entirety of the riser portion and the nut portion form a one-piece, seamless, monolithic construction. The fitting assembly further comprises a second part and a second fastener passing through the second part and secured within the second aperture. The preceding subject matter of this paragraph characterizes example 16 of the present disclosure, wherein example 16 also includes the subject matter according to example 15, above.

The nut portion further comprises a plurality of nut receptacles. The fitting further comprises a plurality of nut assemblies each corresponding with a respective one of the plurality of nut receptacles. The nut portion further comprises an extender bridge between a first nut-assembly-receptacle set, comprising at least two of the plurality of nut receptacles and at least two of the plurality of nut assemblies, and a second nut-assembly-receptacle set, comprising at least two of the plurality of nut receptacles and at least two of the plurality of nut assemblies. The fitting assembly further comprises two first parts, spaced apart from each other. One of the first parts is coupled to the first nut-assembly-receptacle set by respective first fasteners and the other of the first parts is coupled to the second nut-assembly-receptacle set by respective first fasteners. The preceding subject matter of this paragraph characterizes example 17 of the present disclosure, wherein example 17 also includes the subject matter according to example 16, above.

The nut portion further comprises at least one flange protruding from the extender bridge. The at least one flange comprises a plurality of apertures. The fitting assembly further comprises a third part coupled to the at least one flange by third fasteners each extending through the third part and secured within a respective one of the plurality of apertures. The preceding subject matter of this paragraph characterizes example 18 of the present disclosure, wherein example 18 also includes the subject matter according to example 17, above.

Each of the two first parts is a seat track of an aircraft. The second part is an interior cabin monument component of the aircraft. The third part is a floor panel of the aircraft. The preceding subject matter of this paragraph characterizes example 19 of the present disclosure, wherein example 19 also includes the subject matter according to example 18, above.

Additionally disclosed herein is a method of attaching a fitting to a part. The method comprises inserting a nut of a nut assembly of the fitting into an aperture of the part. When the nut is inserted into the aperture, the nut is translatable along a central axis of a nut receptacle of the fitting with translation of the nut along the central axis being constrained by a converging portion of the nut receptacle and a seal non-translatably fixed within the nut receptacle. The method also comprises extending a first fastener through the nut to resiliently deform resilient fingers of the nut away from the central axis. The method further comprises tightening the first fastener to translationally move the nut along the central axis to urge the resilient fingers against the part. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
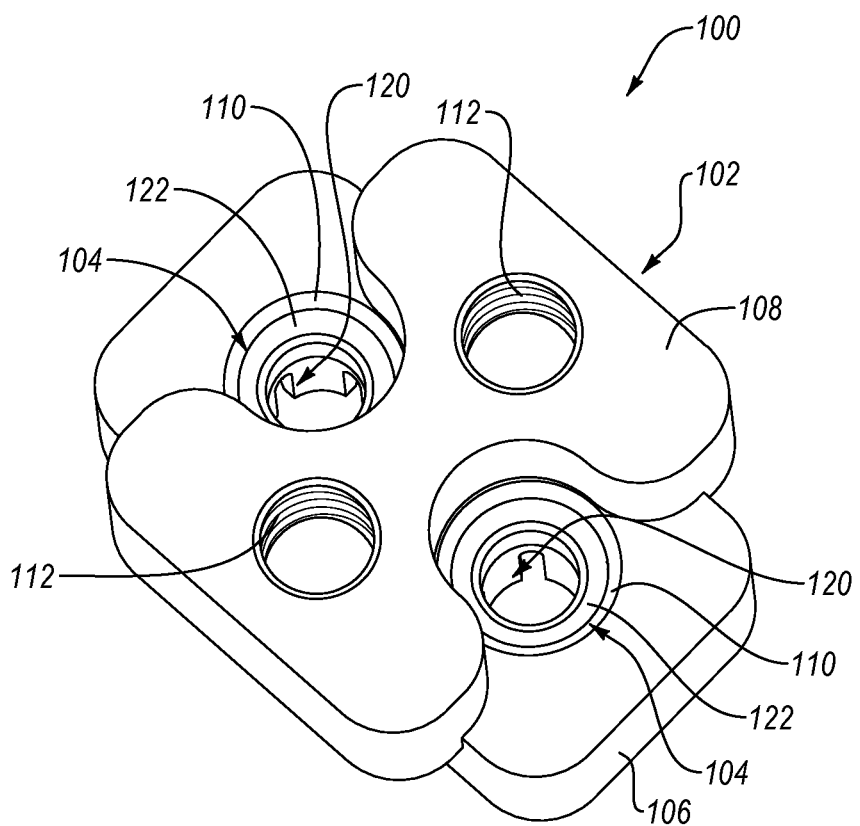
FIG. 1 is a perspective view of a fitting, from a top of the fitting, according to one or more examples of the present disclosure.
Figure 2:
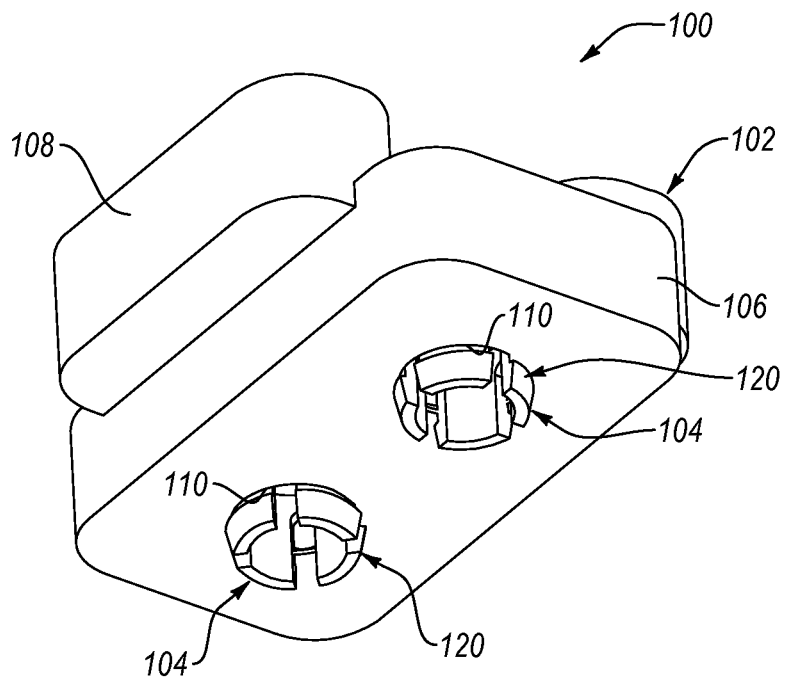
FIG. 2 is a perspective view of the fitting of FIG. 1, from a bottom of the fitting, according to one or more examples of the present disclosure.
Figure 3:
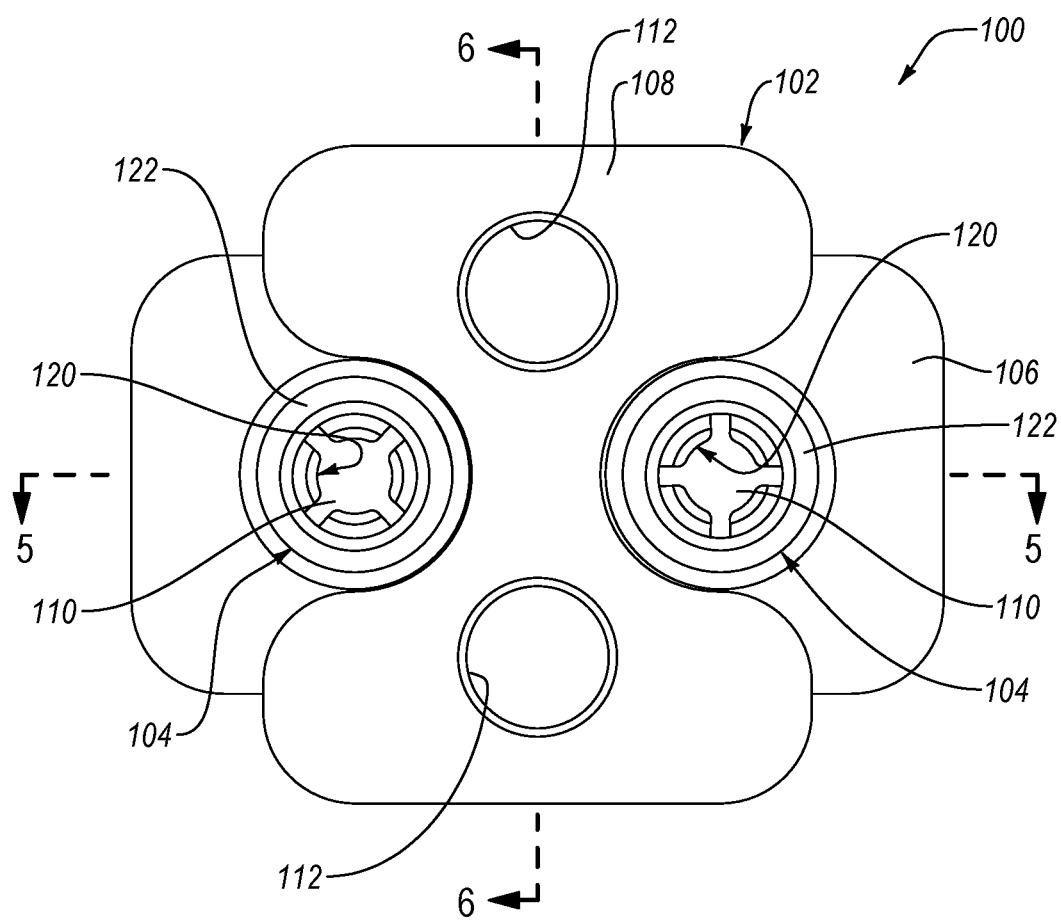
FIG. 3 is a top plan view of the fitting of FIG. 1, according to one or more examples of the present disclosure.
Figure 4:
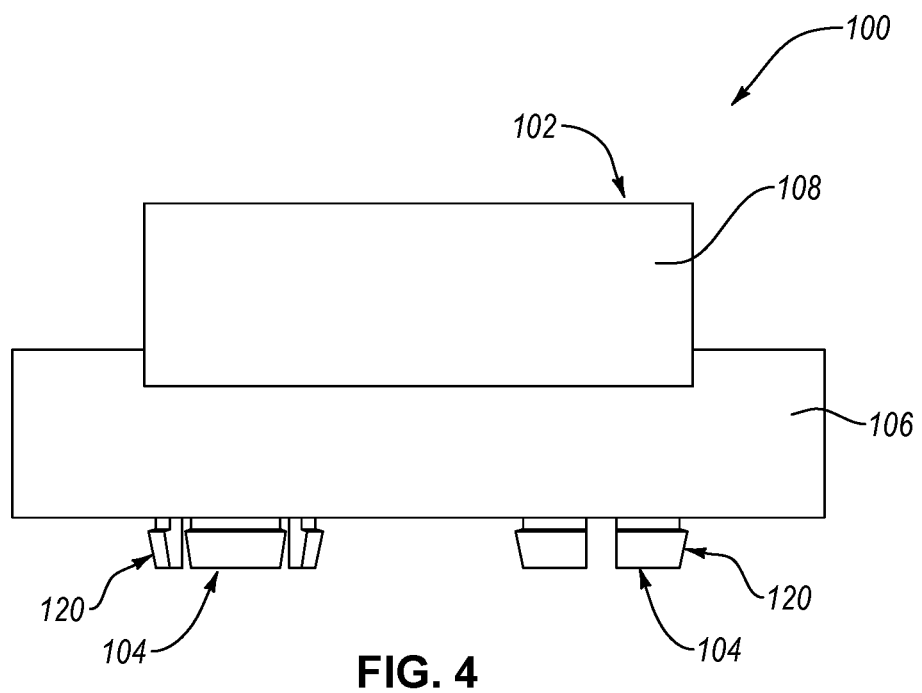
FIG. 4 is a side elevation view of the fitting of FIG. 1, according to one or more examples of the present disclosure.
Figure 5:
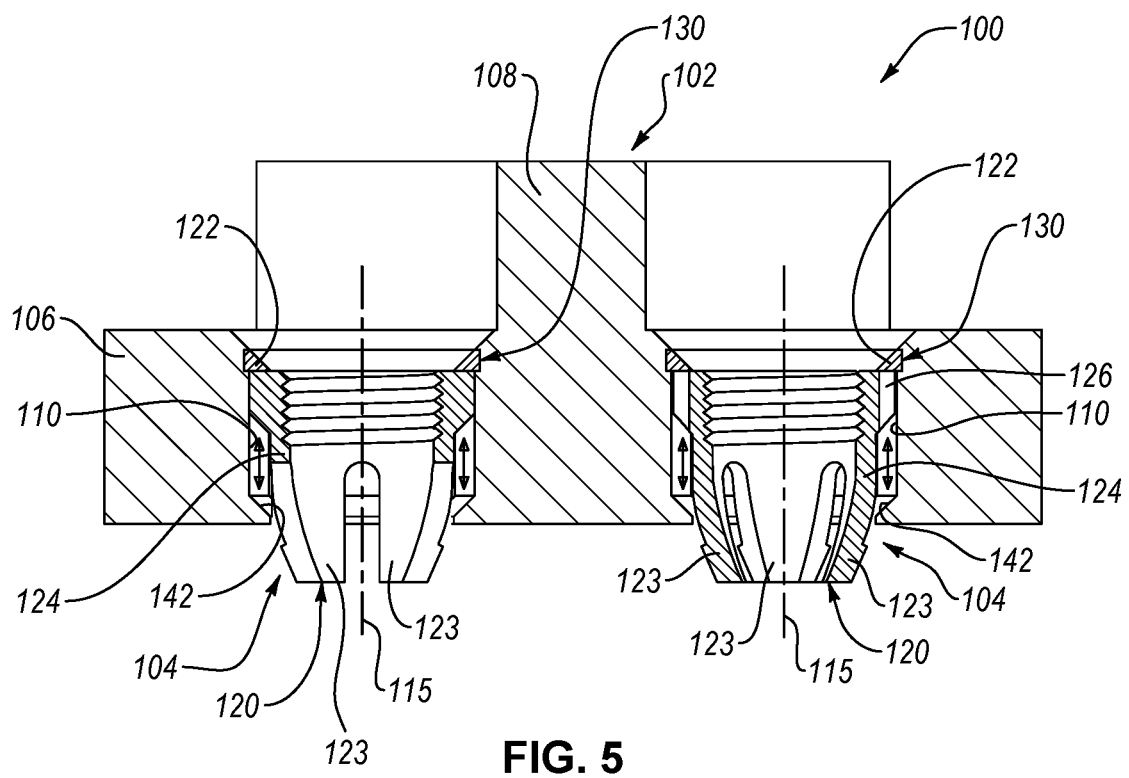
FIG. 5 is a cross-sectional side elevation view of the fitting of FIG. 1, taken along the line 5-5 of FIG. 3, according to one or more examples of the present disclosure.
Figure 6:
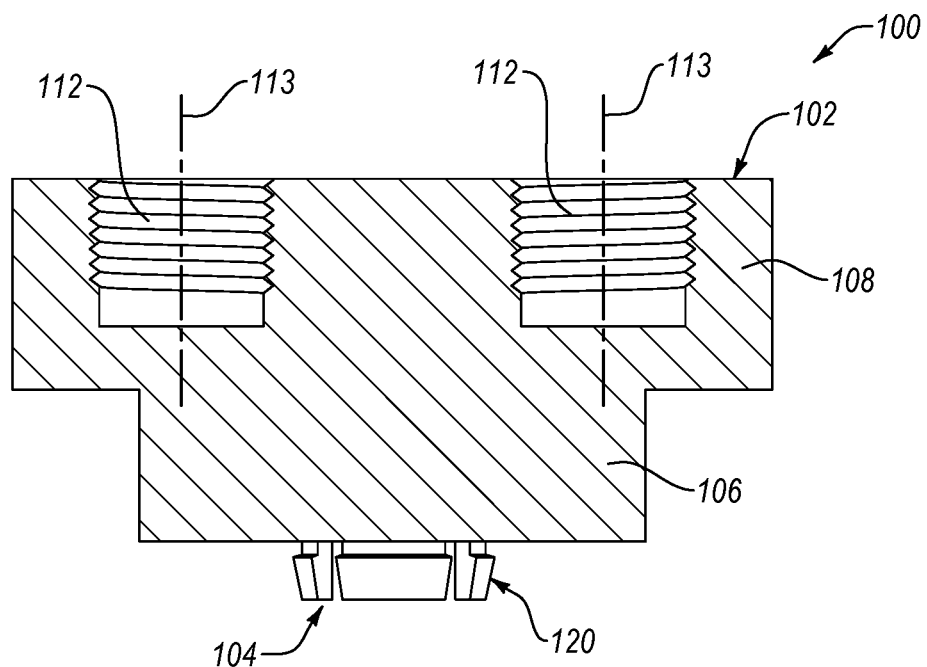
FIG. 6 is a cross-sectional side elevation view of the fitting of FIG. 1, taken along the line 6-6 of FIG. 3, according to one or more examples of the present disclosure.
Figure 7:
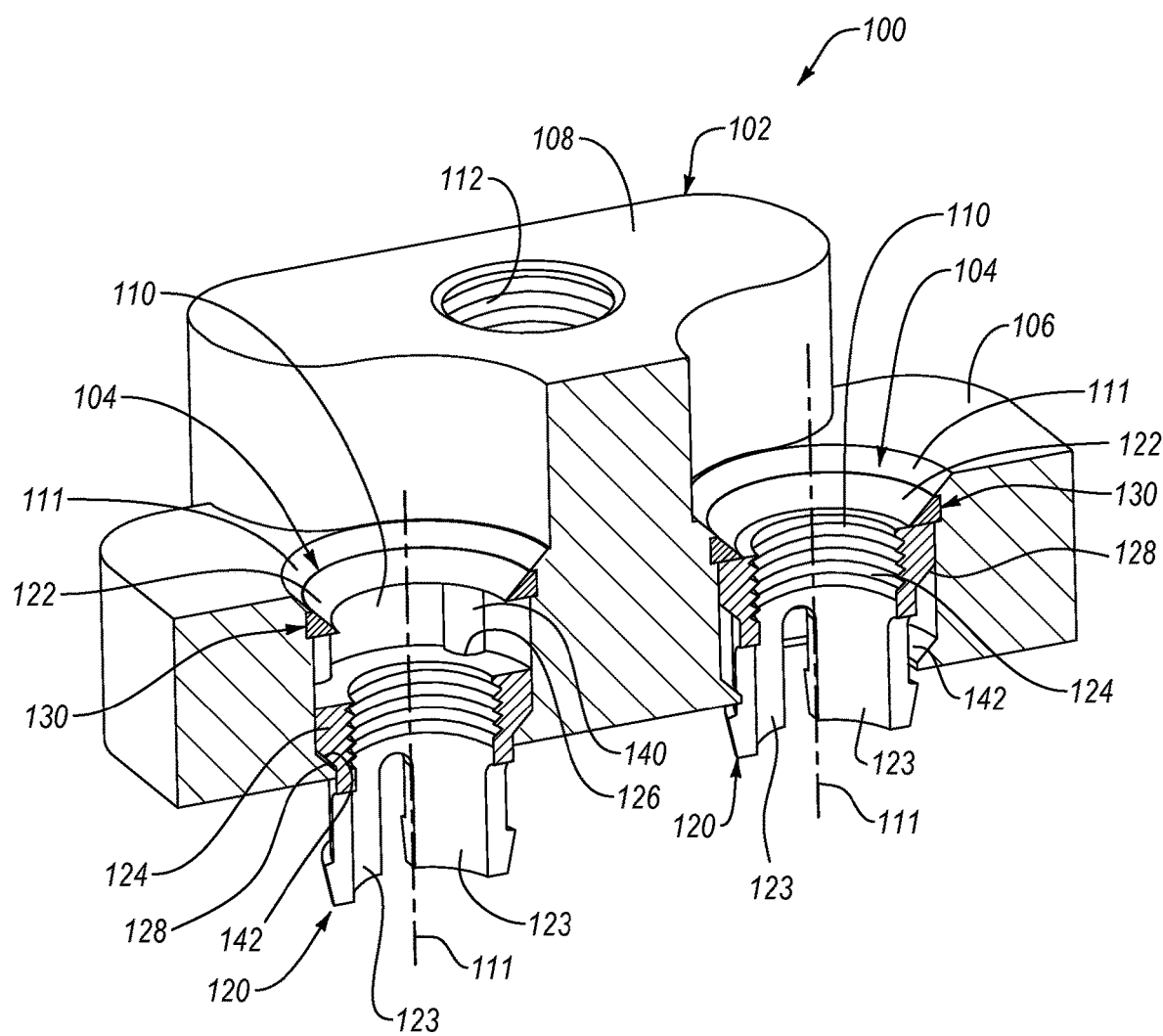
FIG. 7 is a cross-sectional perspective view of the fitting of FIG. 1, taken along the line 5-5 of FIG. 3, according to one or more examples of the present disclosure.
Figure 8:
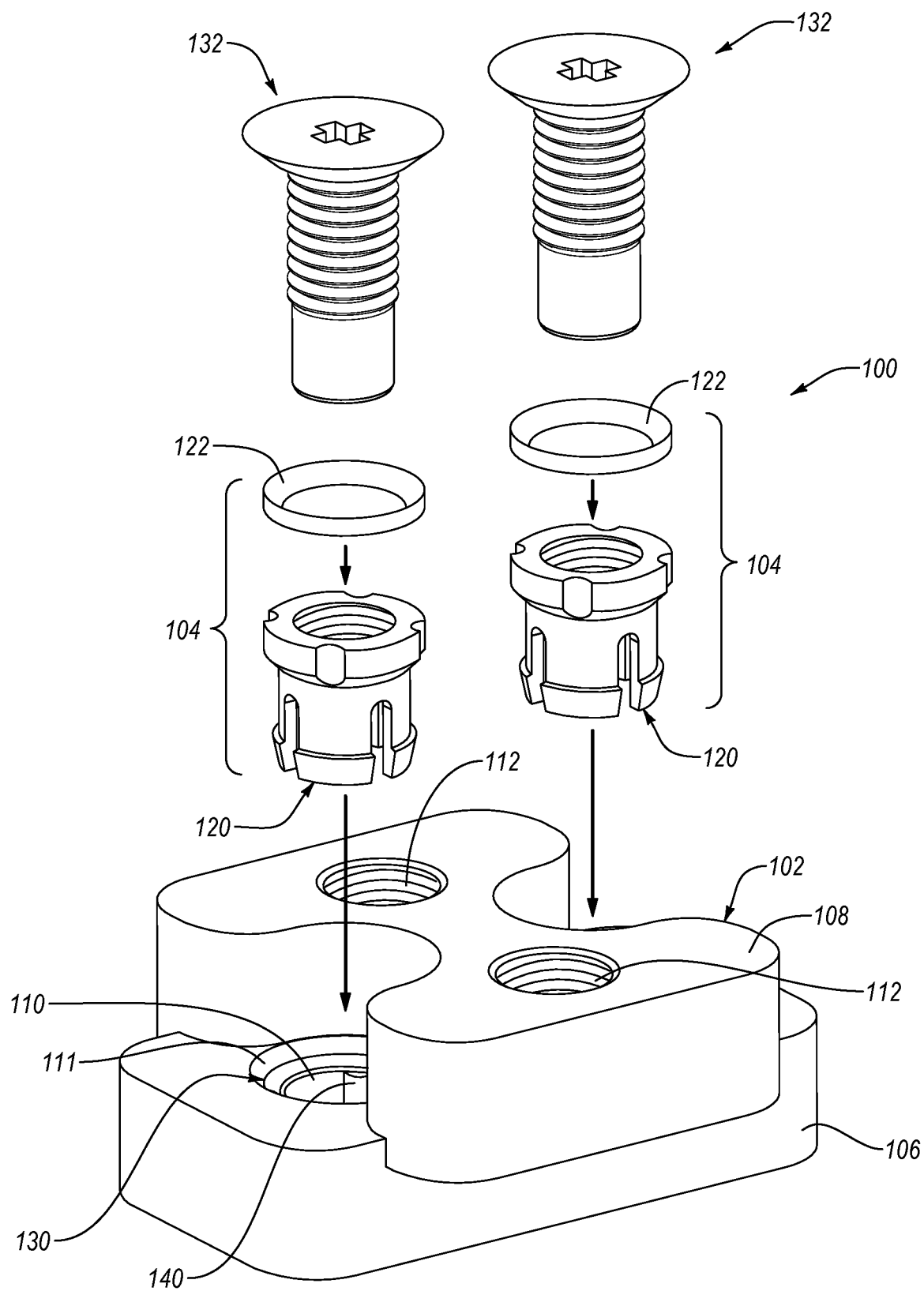
FIG. 8 is an exploded perspective view of the fitting of FIG. 1, according to one or more examples of the present disclosure.
Figure 9:
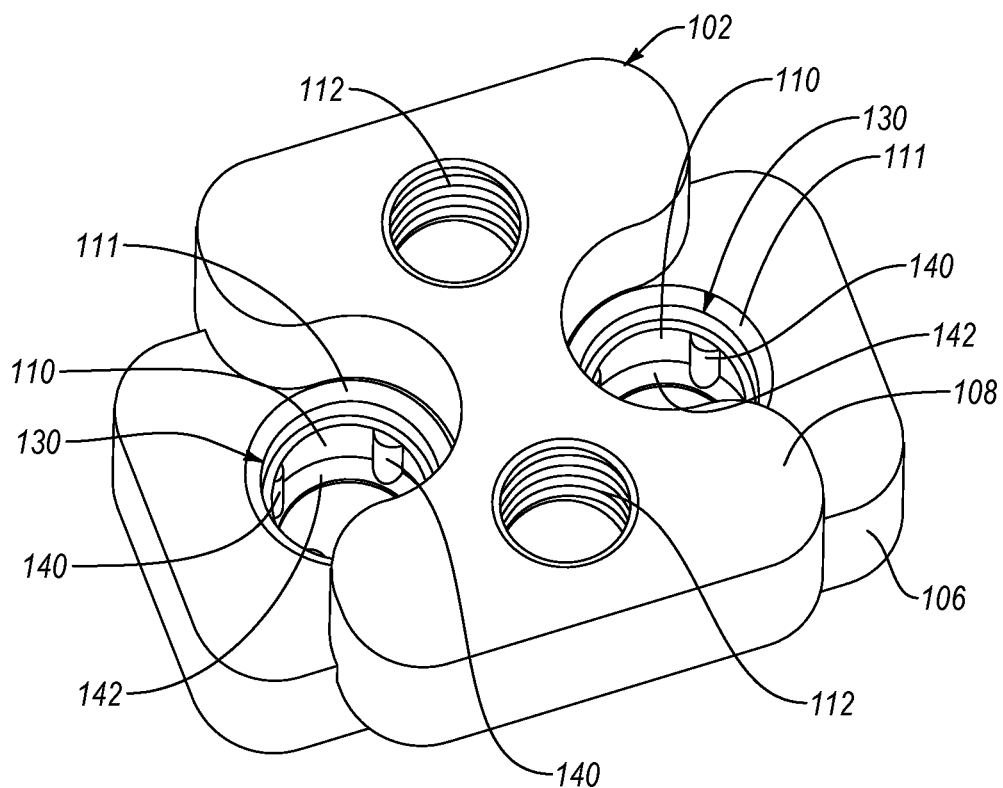
FIG. 9 is a perspective view of a body of the fitting of FIG. 1, according to one or more examples of the present disclosure.
Figure 10:
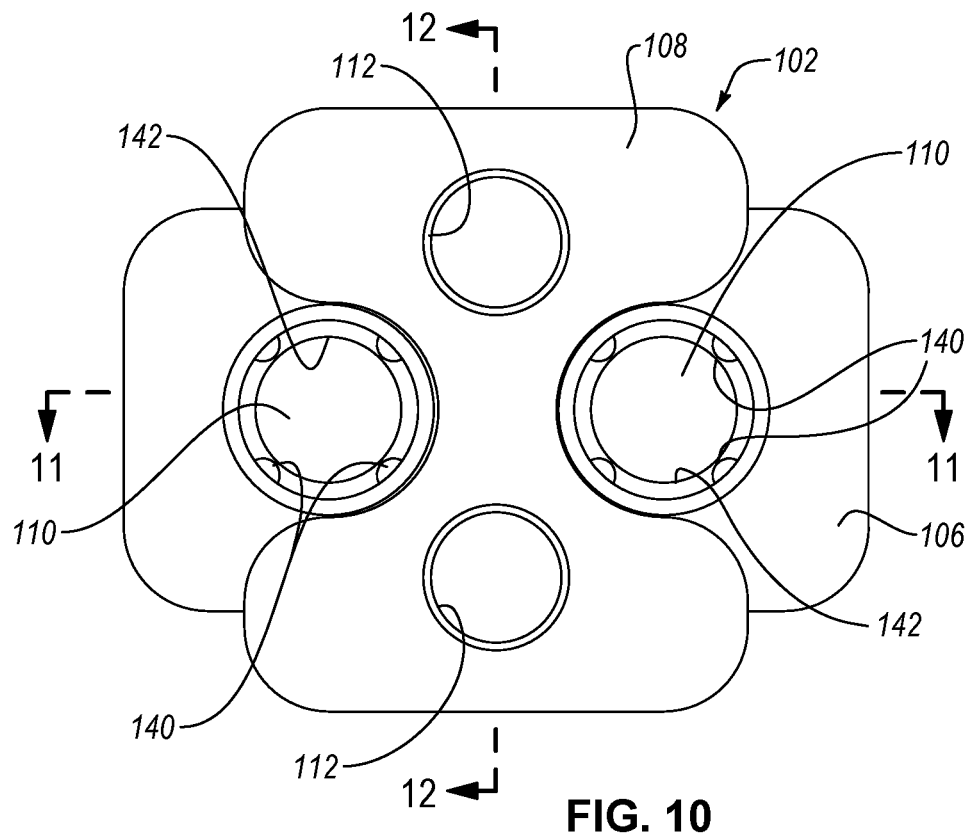
FIG. 10 is a top plan view of the body of FIG. 9, according to one or more examples of the present disclosure.

Referring to FIGS. 1-8, one example of a fitting 100, for attachment to a part, includes a body 102 and a nut assembly 104 coupled to the body 102. The body 102 includes a nut portion 106, which includes a nut receptacle 110. The nut receptacle 110 has a converging portion 142. The nut assembly 104 includes a seal 122 within the nut receptacle 110. The seal 122 is non-translatably fixed relative to the nut receptacle 110 and is spaced apart from the converging portion 142. The nut 120 is within the nut receptacle 110 and is translatable along a central axis 115 of the nut receptacle 110. Additionally, the nut 120 includes resilient fingers 123 that are resiliently deformable away from the central axis 115 of the nut receptacle 110. Translation of the nut 120 along the central axis 115, as indicated by directional arrows in FIG. 5, is constrained by the converging portion 142 and the seal 122.

The fitting 100 helps to simplify and improve the efficiency of the attachment of one part relative to another part. In particular, the fitting 100 allows parts to be attached to each other when one side of at least one of the parts is inaccessible, thus making attachment with conventional nut and bolt arrangement impractical.

Accordingly, the fitting 100 facilitates secure attachment of parts without accessing both sides of the parts. The seal 122, being spaced apart from the converging portion 142, allows the nut 120 to translationally move within the nut receptacle 110 in a controlled manner. Moreover, the seal 122, being non-translatably fixed relative to the nut receptacle 110, ensures the offset between the seal 122 and the converging portion 142 is maintained. Because translational movement of the nut 120 within the nut receptacle 110 of the body 102 is constrained by the converging portion 142 of the nut receptacle 110 and the seal 122, the nut 120 and body 102 can be handled (e.g., stored and transported) as a single modular unit leading to attachment of the parts at an assembly site. Accordingly, in contrast to prior art techniques, which require multiple parts of fittings to be separately handled and coupled together only at the assembly site, which can lead to handling errors and lost components. With the nut 120 and body 102 being pre-assembly as a single module unit, the fitting 100 can be quickly and easily handled and transported to an assembly site for attachment of the parts without the potential of separating the nut 120 and the body 102. Moreover, the seal 122 helps to promote the dual purpose of preventing contaminants from contaminating attached parts through the fitting 100 and effectually encapsulating the nut 120 within the nut receptacle 110 of the body 102.

As shown in FIG. 5, the converging portion 142 of the nut receptacle 110 has a cross-sectional area that is less than a maximum cross-sectional area of the nut 120. Accordingly, the converging portion 142 acts as a stop to prevent further translational movement of the nut 120 in a first direction (e.g., downward direction in reference to FIG. 5). The convergence of the converging portion 142 can be abrupt, such as a square-shaped shelf or lip. Alternatively, as shown, the convergence of the converging portion 142 can be gradual, such as a tapered surface.

Figure 11:
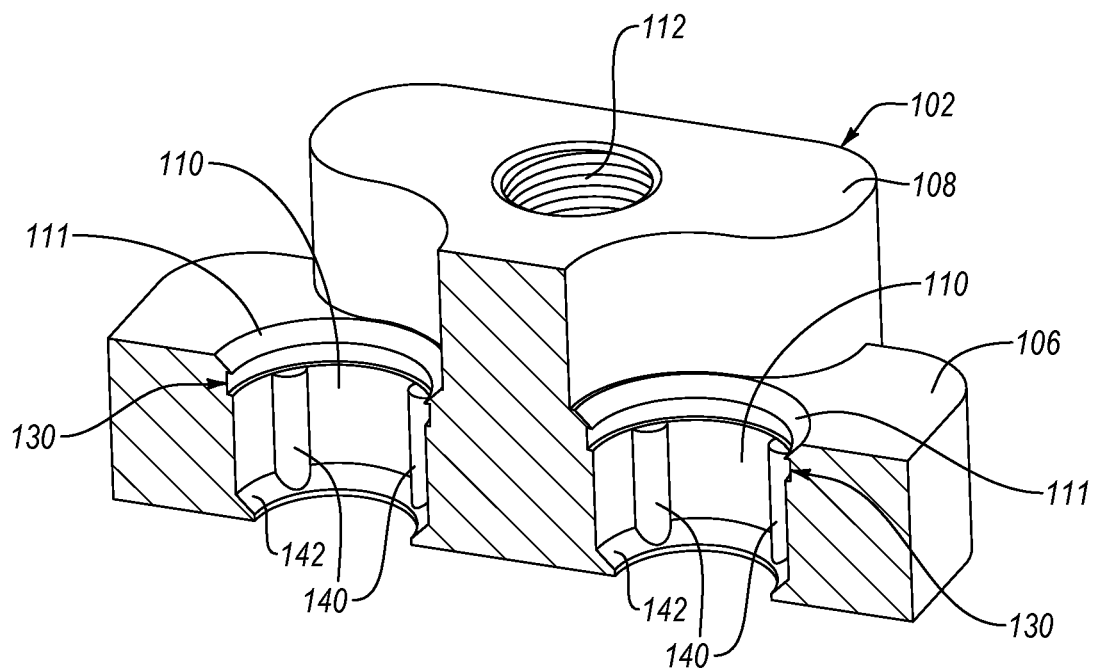
FIG. 11 is a cross-sectional perspective view of the body of FIG. 9, taken along the line 11-11 of FIG. 10, according to one or more examples of the present disclosure.
Figure 12:
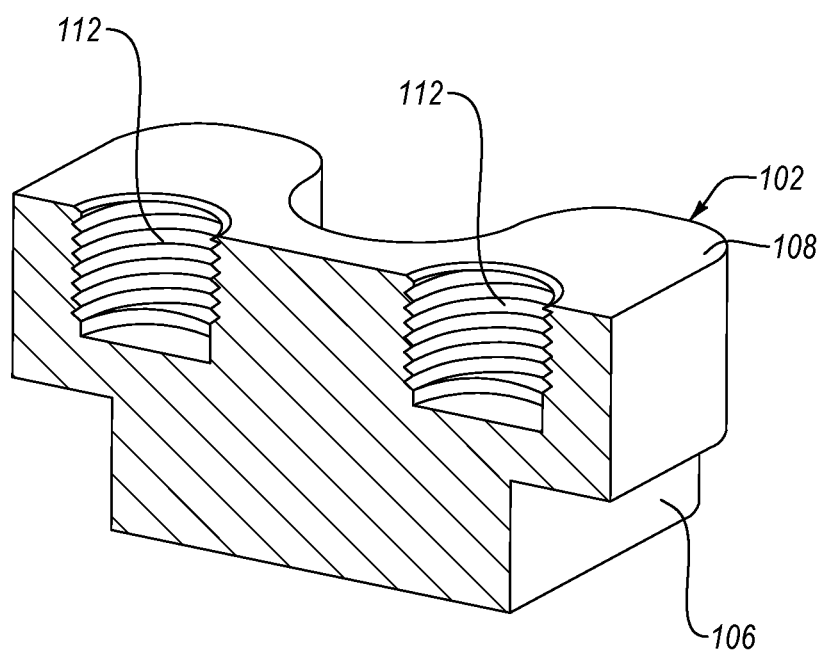
FIG. 12 is a cross-sectional perspective view of the body of FIG. 9, taken along the line 12-12 of FIG. 10, according to one or more examples of the present disclosure.
Figure 13:
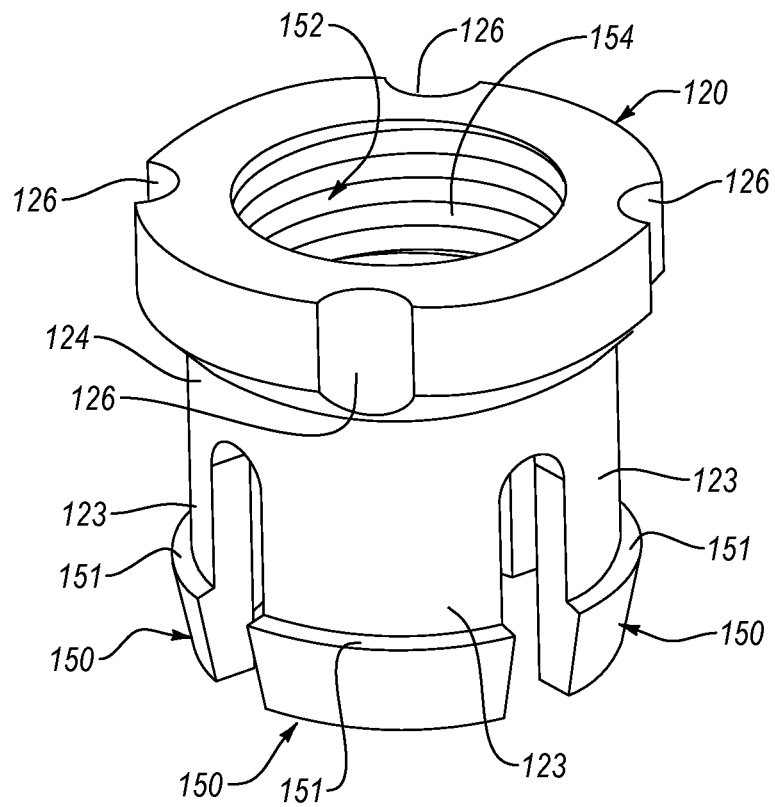
FIG. 13 is a perspective view of a nut of the fitting of FIG. 1, according to one or more examples of the present disclosure.
Figure 14:
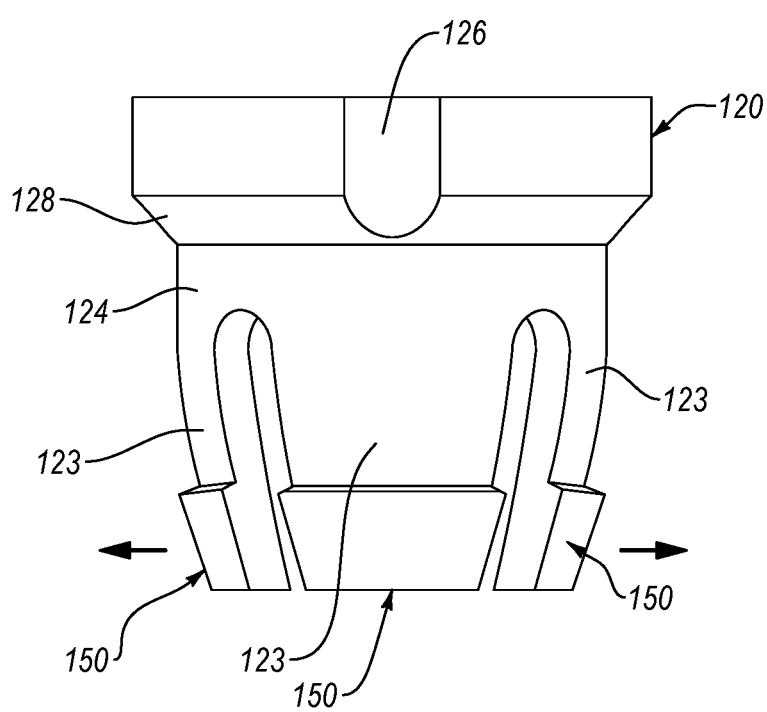
FIG. 14 is a side elevation view of the nut of FIG. 13, according to one or more examples of the present disclosure.
Figure 15:
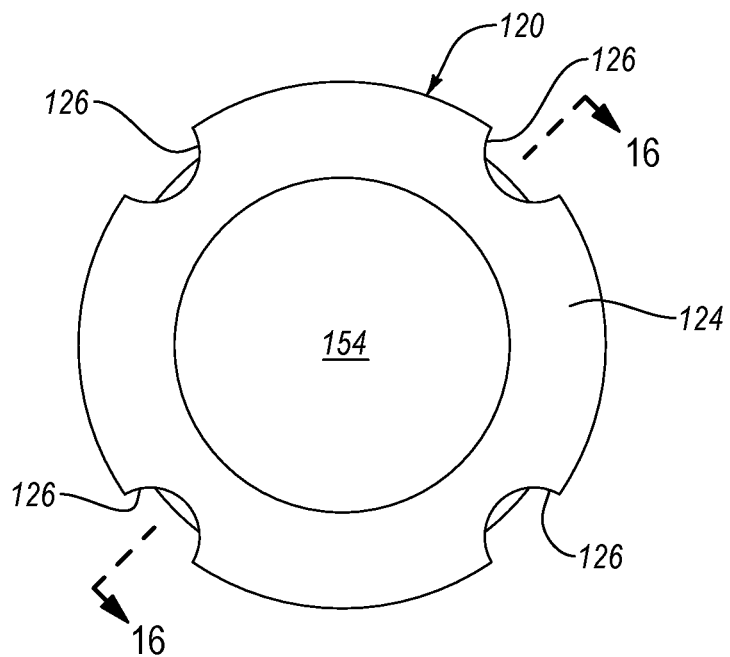
FIG. 15 is a top plan view of the nut of FIG. 13, according to one or more examples of the present disclosure.
Figure 16:
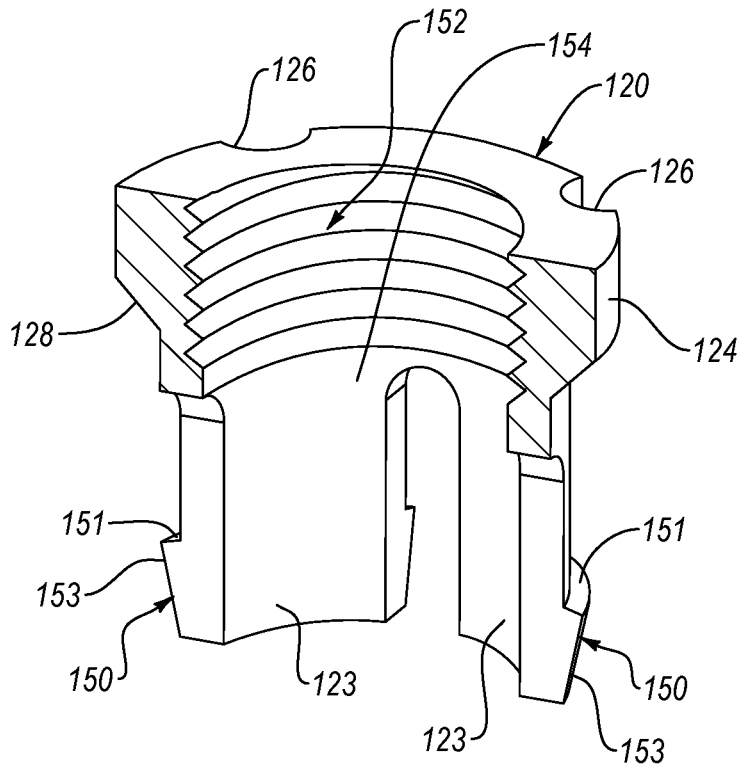
FIG. 16 is a cross-sectional perspective view the nut of FIG. 13, taken along the line 16-16 of FIG. 15, according to one or more examples of the present disclosure.

Again, referring to FIG. 5, the seal 122 defines an opening having a cross-sectional area that is less than a maximum cross-sectional area of the nut 120. Accordingly, the seal 122 acts as a stop to prevent further translational movement of the nut 120 in a second direction (e.g., upward direction in reference to FIG. 5), opposite the first direction. In one example, the seal 122 is non-translatably fixed relative to the nut receptacle 110 by an annular groove 130 formed in the nut receptacle 110. As shown in FIG. 11, the annular groove 130 is inset into the sidewall of the nut receptacle 110 at a depth sufficient to receive and retain an outer peripheral portion of the seal 122. The seal 122 has an annular shape, corresponding to the shape of the annular groove 130, and fits within the annular groove 130. In some examples, the seal 122 is configured to snap-fit into the annular groove 130. The seal 122 is made of a resiliently flexible material, such as an elastomer (e.g., rubber, silicone, and plastic) in some examples. Accordingly, the seal 122 can elastomerically resiliently deform to insert the seal 122 into the annular groove 130 and resilient deformed against a fastener to seal the interface between the seal 122 and the fastener (see, e.g., FIG. 18). However, in other examples, the seal 122 is made of a relatively non-elastomeric material, such as metal. Even if made of a non-elastomeric material, the seal 122 can be designed to allow for some resilient deformation for insertion of the seal 122 within the annular groove 130. For example, the seal 122 can be made of a metallic snap ring.

Additionally, in certain examples, the seal 122 has a triangular cross-sectional shape. The triangular cross-sectional shape helps to define a tapered surface that receives and directly contacts a tapered head of a flat-head type fastener, such as first fastener 132 of FIG. 18. As shown in FIGS. 9-11 and 18, the nut receptacle 110 also includes a countersunk portion 111, in some examples, to matingly engage the tapered head of a flat-head type fastener. The taper of the tapered surface of the seal 122 corresponds with the taper of the countersunk portion 111 to create a combined tapered surface configured to matingly engage the tapered head of a flat-heat type fastener. In other words, the tapered surface of the seal 122 sits substantially flush with, but slightly raised relative to, the countersunk portion 111 of the nut receptacle 110. The seal 122, being slightly raised relative to the countersunk portion 111, but having a corresponding taper, allows the seal 122 to elastomerically resiliently deform against the tapered head of the first fastener 132, to create a seal, without preventing a proper seating of the tapered head against the countersunk portion 111. In other examples, the nut receptacle 110 and the seal 122 can be sized and shaped to receive a fastener with another type of head, such as a pan-type, a round-type, a hex-type, a socked-cap-type, and the like.

Referring to FIGS. 7-11, the nut receptacle 110 further includes a first anti-rotation feature 140. Correspondingly, referring to FIGS. 13-16, the nut 120 further includes a second anti-rotation feature 126. Engagement between the first anti-rotation feature 140 and the second anti-rotation feature 126 prevents rotation of the nut 120 relative to the nut receptacle 110 and allows translational movement of the nut 120 relative to the nut receptacle 110. In one example, the nut receptacle 110 has a circular cross-sectional shape and the first anti-rotation feature 140 is a rib formed in a sidewall of the nut receptacle 110 and extending parallel to the central axis 115 of the nut receptacle 110. The second anti-rotation feature 126 of the nut 120 is a groove configured to matingly receive the rib of the nut receptacle 110. The rib extends only a portion of the entire length of the nut receptacle 110 such that the rib is interposed between the annular groove 130 and the converging portion 142 of the nut receptacle 110. The circular cross-sectional shape of the nut receptacle 110 is easier to make (e.g., machine or mold) than non-circular cross-sectionally shaped receptacles. To promote anti-rotational engagement, the first anti-rotation feature 140 can be a plurality of ribs and the second anti-rotation feature 126 can be a plurality of grooves each in mating engagement with a respective one of the ribs. For example, the first anti-rotation feature 140 in the illustrated implementations includes four ribs and the second anti-rotation feature 126 includes four grooves. Alternatively, the anti-rotation features can be reversed, such that the first anti-rotation feature 140 includes one or more grooves and the second anti-rotation feature 126 includes one or more ribs.

According to some examples, the first anti-rotation feature 140 is a non-circular cross-sectional shape of the nut receptacle 110 and the second anti-rotation feature 126 is a corresponding non-circular cross-sectional shape of the nut 120. The non-circular cross-sectional shape can be ovular, square, rectangular, triangular, polygonal (e.g., hexagonal), and the like.

Referring to FIGS. 13-16, in some examples, the nut 120 includes a head 124 from which the resilient fingers 123 extend. The resilient fingers 123 are configured to flex near the junction between the resilient fingers 123 and the head 124. The second anti-rotation feature 126 of the nut 120 is formed in the head 124 of the nut 120. The nut 120 additionally includes internal threads 152 formed in the head 124. The internal threads 152 are formed in an interior sidewall of the nut 120 that defines a central channel 154 of the nut 120. The central channel 154 is configured to receive a first fastener 132 and the internal threads 152 are configured to threadably engage threads of the first fastener 132. The central channel 154 is radially inwardly tapered, due to a radially inward projection of the resilient fingers 123.

Engagement of the threads of the first fastener 132 and the internal threads 152 of the nut 120 rotatably couple the nut 120 and the first fastener 132 together and allow the nut 120 to translatably move relative to the first fastener 132 when the first fastener 132 is rotated relative to the nut 120. Each of the resilient fingers 123 includes at least one tooth 150 configured to engage a blind surface of a first part 202, opposite an exposed surface of the first part 202 onto which the nut portion 106 of the fitting 100 is attached. Each tooth 150 includes a shelf 151, ledge, or overhang that directly engages the blind surface of the first part 202 as the first fastener 132 is tightened within the nut 120. Each tooth 150 may also include a tapered radially outward surface 153 that helps to align the nut 120 with the nut receptacle 110 when the nut 120 is inserted into the nut receptacle 110.

Referring to FIGS. 9-12, in some examples, the body 102 further includes a riser portion 108 that protrudes from the nut portion 106. The riser portion 108 includes at least one second aperture 112. In one example, the second aperture 112 has a central axis 113 (see, e.g., FIG. 6) that is parallel with the central axis 115 of the nut receptacle 110. An entirety of the riser portion 108 and the nut portion 106 form a one-piece, seamless, monolithic construction in certain examples. The riser portion 108 helps to attach one or more additional parts to the fitting 100 such that the fitting 100 can be used to attach one part to another part. The central axis 113 of the second aperture 112 of the riser portion 108, being parallel with the central axis 115 of the nut receptacle 110, promotes the attachment of offset parts relative to each other. As described below, the offset parts can be relatively planar such that, when attached to the fitting 100, are parallel to and spaced apart from each other. However, in other examples, the central axis 113 of the second aperture 112 of the riser portion 108 is angled relative to the central axis 115 of the nut receptacle 110. The one-piece, seamless, monolithic construction of the body 102, including the nut portion 106 and the riser portion 108, reduces the overall part count of the body 102, which reduces the complexity of attaching parts to the body 102 and improves the storage and handling of the body 102.

The riser portion 108 can have any of various shapes and sizes. In the illustrated example of FIG. 1, the riser portion 108 has a shape (e.g., H-shape) that different than the nut portion 106.

In the illustrated examples, the riser portion 108 includes multiple threaded apertures 112. The threaded apertures 112 are configured to receive a fastener for attaching a part to the riser portion 108. The threads of the threaded apertures 112 can be configured to receive the corresponding threads of the fastener in some examples. In other examples, the threads of the threaded apertures 112 are configured to receive a helicoil, which in turn receives and self-tightens a corresponding fastener. The threaded apertures 112 can be blind holes or through holes.

In the illustrated examples, the nut portion 106 of the fitting 100 includes a plurality of nut receptacles 110 and the fitting 100 includes a plurality of nut assemblies 104, each corresponding with a respective one of the plurality of nut receptacles 110. In other words, the seal 122 of each nut assembly 104 is within a respective one of the nut receptacles 110 and the nut 120 of each nut assembly 104 is within a respective one of the nut receptacles 110. A fitting 100 with a plurality of nut receptacles 110 and nut assemblies 104 promotes the strength and stability of the attachment between the nut portion 106 of the fitting 100 and a part by utilizing more than one nut receptacle 110 and more than one nut assembly 104 to attach a single part.

Additionally, a fitting 100 with a plurality of nut receptacles 110 and nut assemblies 104 facilitates the attachment of more than one part to the nut portion 106 of the fitting 100. For example, referring to FIGS. 20-26, the fitting 100 is configured to promote attachment of two separate and spaced-apart parts to the nut portion 106 of the fitting 100. The nut portion 106 of the fitting 100 in this example includes an extender bridge 170 that extends between a first end 172 of the nut portion 106 and a second end 174 of the nut portion 106, opposite the first end 172. Accordingly, the extender bridge 170 extends between a first nut-assembly-receptacle set 190 and a second nut-assembly-receptacle set 192, which are located at the first end 172 and the second end 174, respectively, of the nut portion 106.

The first nut-assembly-receptacle set 190 includes at least two of the plurality of nut receptacles 110 and at least two of the plurality of nut assemblies (104), within respective nut receptacles 110. Similarly, the second nut-assembly-receptacle set 192 includes at least two of the plurality of nut receptacles 110 and at least two of the plurality of nut assemblies 104, within respective nut receptacles 110. The extender bridge 170 helps to define a length L between the first nut-assembly-receptacle set 190 and a second nut-assembly-receptacle set 192. The length L can be any of various distances based on a desired distance between the parts attached to the respective first nut-assembly-receptacle set 190 and the second nut-assembly-receptacle set 192. Generally, the extender bridge 170 is elongated such that a width of the extender bridge 170 is significantly less than the length L of the extender bridge 170. Although the fitting 100 of FIGS. 20-26 includes two nut-assembly-receptacle sets, in other examples, the fitting 100 can include three or more nut-assembly-receptacle sets for attachment to two or more separate parts.

Figure 21:
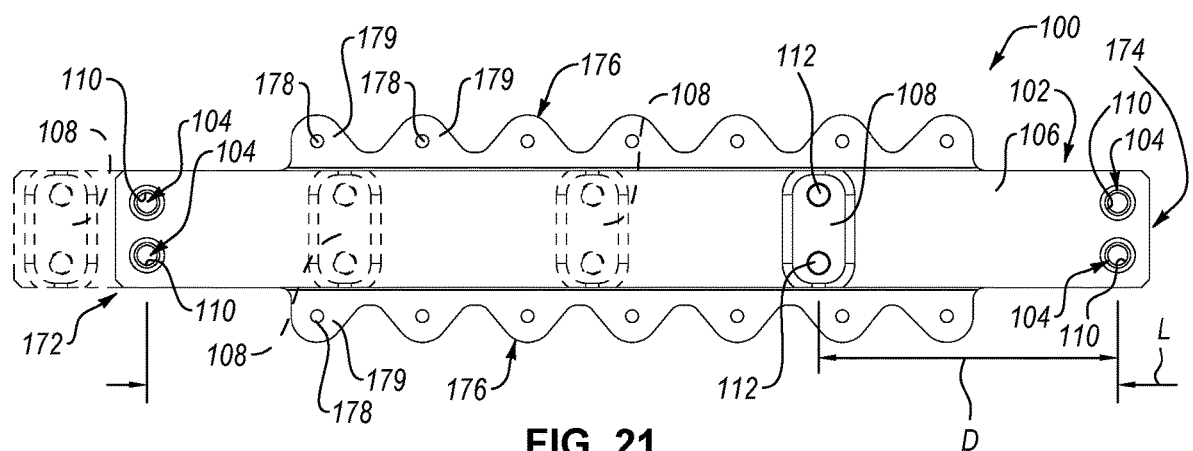
FIG. 21 is a top plan view of the fitting of FIG. 20, according to one or more examples of the present disclosure.
Figure 22:
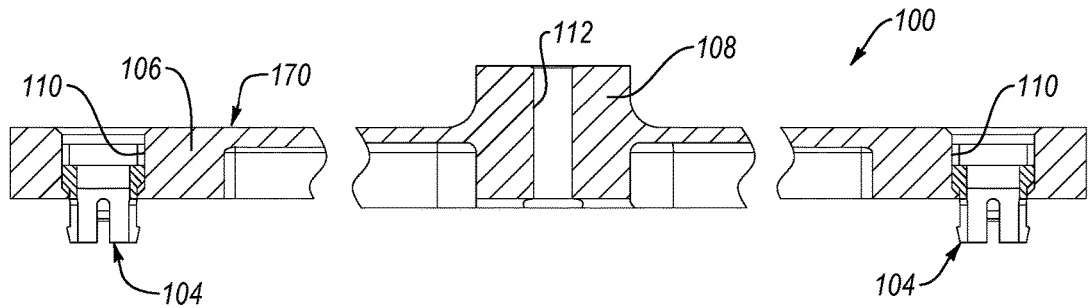
FIG. 22 is a cross-sectional side elevation view of the fitting of FIG. 20, taken along the line 22-22 of FIG. 20, according to one or more examples of the present disclosure.

The riser portion 108 of the body 102 of the fitting 100 can be located at any of various locations along the nut portion 106, including along the extender bridge 170 or away from the extender bridge 170. In this manner, a riser portion 108 can be located a distance D away from one of the first nut-assembly-receptacle set 190 and the second nut-assembly-receptacle set 192 as desired to accommodate attachment of variously locatable parts. Referring to FIGS. 20-26, in one example, the body 102 includes a riser portion 108 at a mid-point between the first nut-assembly-receptacle set 190 and the second nut-assembly-receptacle set 192. However, as shown in dashed line, in another example, the body 102 includes a riser portion 108 between the first nut-assembly-receptacle set 190 and the second nut-assembly-receptacle set 192, but located closer to the first nut-assembly-receptacle set 190 than the second nut-assembly-receptacle set 192 or closer to the second nut-assembly-receptacle set 192 than the first nut-assembly-receptacle set 190. Referring specifically to FIG. 21, in some examples, the riser portion 108 is not located on the extender bridge 170, but rather distally from one of the first nut-assembly-receptacle set 190 and the second nut-assembly-receptacle set 192. In FIG. 21, a riser portion 108, shown in dashed line, is located distally from the first nut-assembly-receptacle set 190 such that the first nut-assembly-receptacle set 190 is between the second nut-assembly-receptacle set 192 and the riser portion 108. In an alternative example, a riser portion 108 can be located distally from the second nut-assembly-receptacle set 192 such that the second nut-assembly-receptacle set 192 is between the first nut-assembly-receptacle set 190 and the riser portion 108. In some examples, the body 102 can include more than one riser portion 108 located at any of various positions on the nut portion 106, such as multiple riser portions 108 protruding from the extender bridge 170.

Again referring to FIGS. 20-26, in some examples, the nut portion 106 of the fitting 100 further includes at least one flange 176 protruding from the extender bridge 170. The at least one flange 176 includes a plurality of apertures 178. The flange 176 provides additional structure to which additional parts may be attached to the fitting 100. Accordingly, the flange 176 promotes the ability to construct more complex fitting assemblies with the fitting 100. Additionally, in some examples, an entirety of the nut portion 106, including the extender bridge 170 and the flange 176, has a one-piece, seamless, monolithic construction.

In the illustrated example, the flange 176 protrudes from the extender bridge 170 perpendicularly relative to the length L of the extender bridge 170. Additionally, as shown, the fitting 100 can include two flanges 176, opposing each other and each protruding from an opposite side of the extender bridge 170. The two flanges 176 are configured the same in certain examples, or differently in other examples. To reduce weight, each flange 176 can include a plurality of tabs each including a respective one of the apertures 178.

Figure 17:
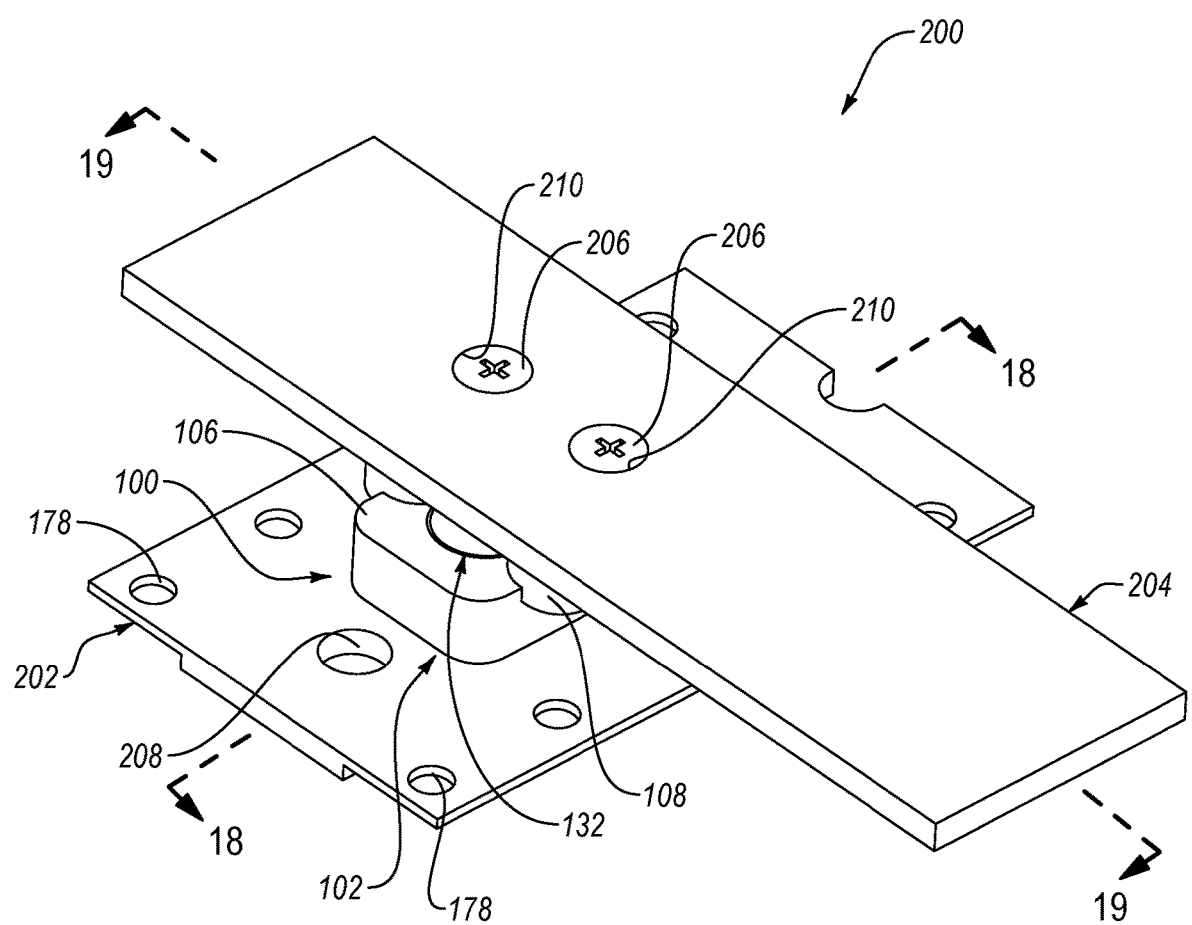
FIG. 17 is a perspective view of a fitting assembly, according to one or more examples of the present disclosure.
Figure 18:
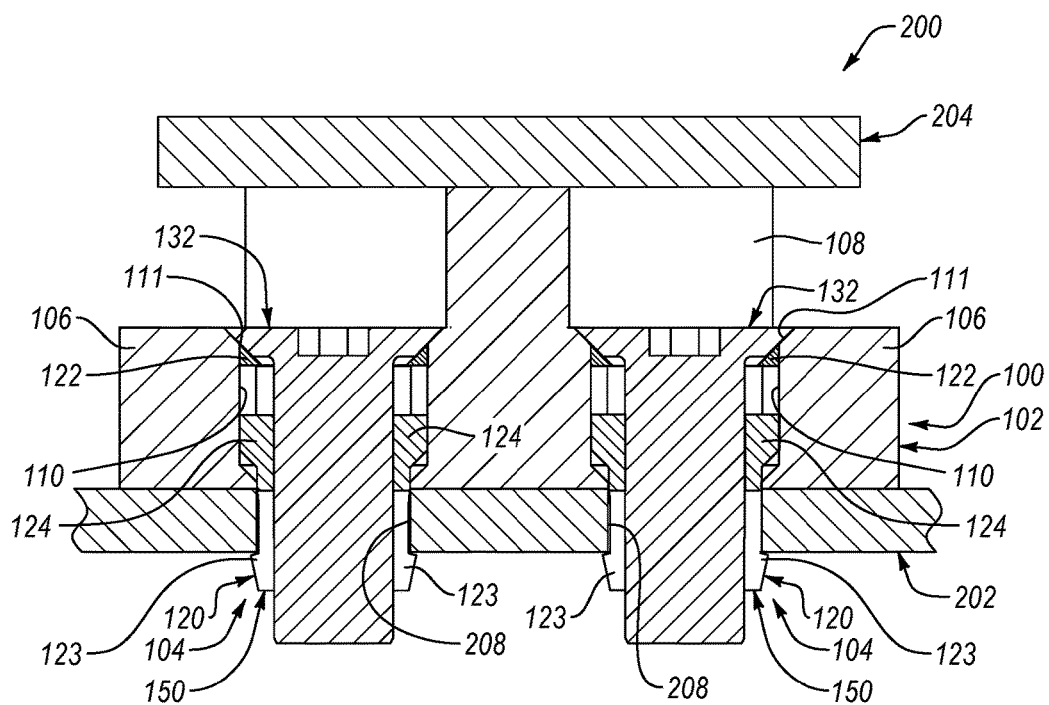
FIG. 18 is a cross-sectional side elevation view of the fitting assembly of FIG. 17, taken along the line 18-18 of FIG. 17, according to one or more examples of the present disclosure.
Figure 19:
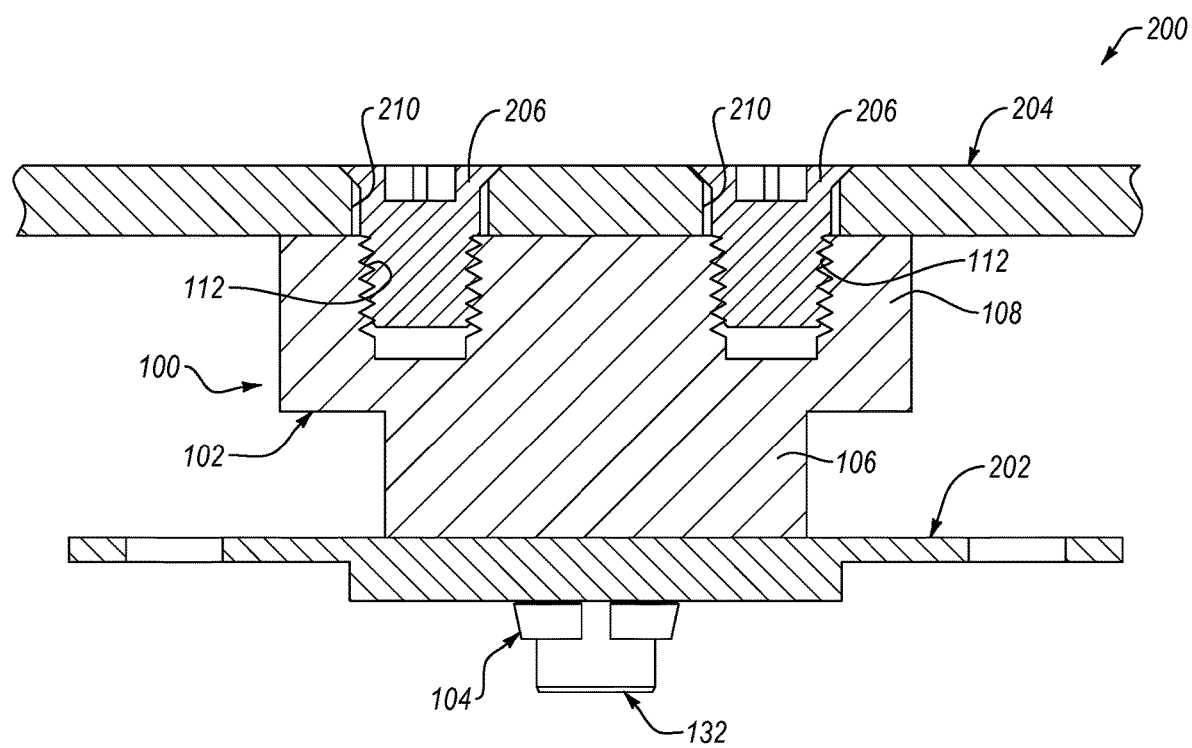
FIG. 19 is a cross-sectional side elevation view of the fitting assembly of FIG. 17, taken along the line 19-19 of FIG. 17, according to one or more examples of the present disclosure.
Figure 20:
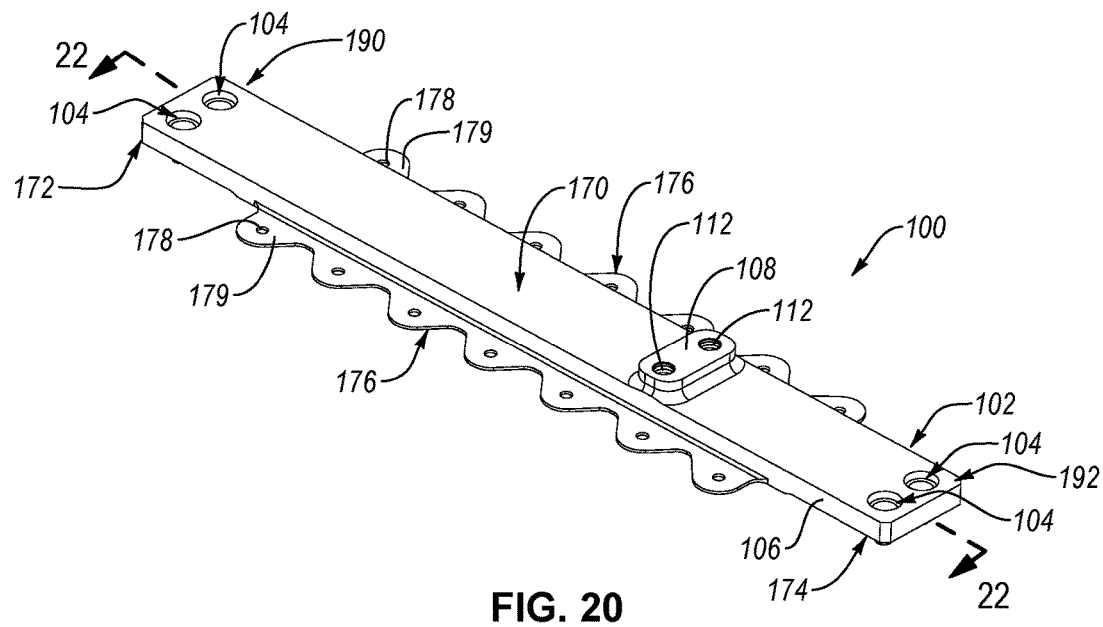
FIG. 20 is a perspective view of a fitting, from a top of the fitting, according to one or more examples of the present disclosure.

Referring to FIGS. 17-19, according to one example, the fitting 100 is used to construct a fitting assembly 200. The fitting assembly 200 includes the fitting 100 and at least one first part 202. Additionally, the fitting assembly 200 includes a first fastener 132 that passes through the first part 202 and is secured within the nut 120 of the nut assembly 104. The first fastener 132 causes the resilient fingers 123 of the nut 120 to deform away from the central axis 113. The nut 120 is translatable along a central axis 115 of the nut receptacle 110, with translation of the nut 120 along the central axis 115 being constrained by the converging portion 142 and the seal 122, without the first fastener 132 passing through the nut 120. As presented above, movement of the nut 120 within the nut receptacle 110 is fully constrained without the assistance of a fastener. Accordingly, the fitting 100 ensures the nut 120 is contained the nut receptacle 110 whether the fastener has been inserted into the nut receptacle 110 or not.

Figure 27:
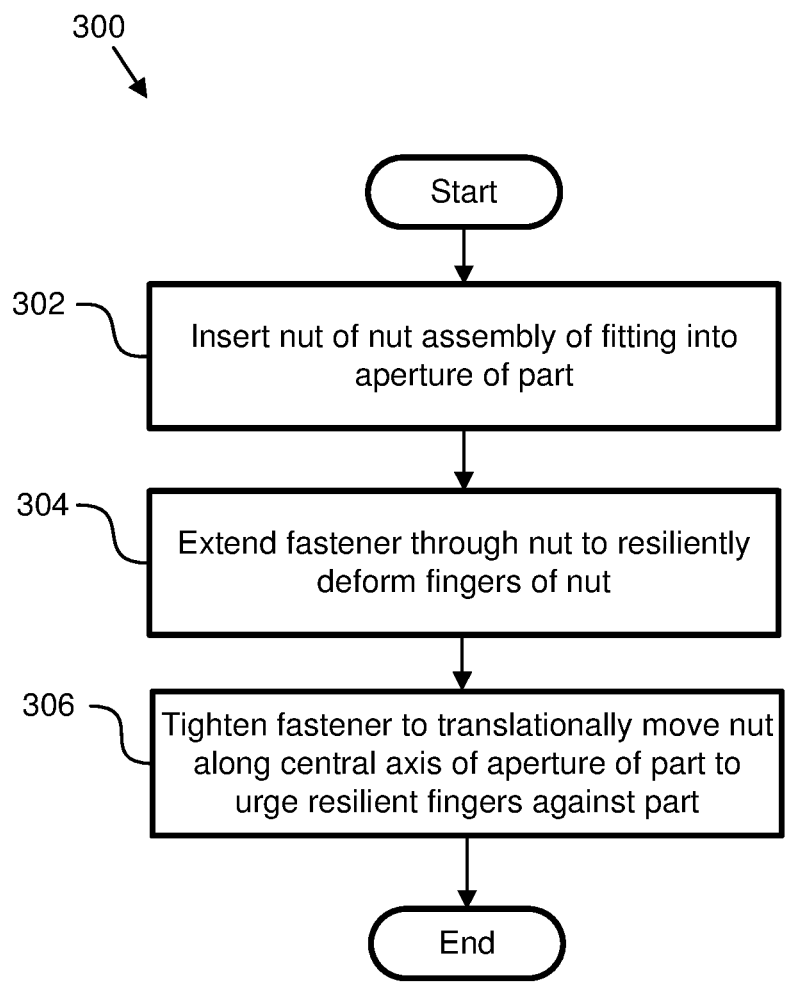
FIG. 27 is schematic flow chart of a method of attaching a fitting to a part, according to one or more examples of the present disclosure.

Referring to FIG. 27, a part, including the first part 202, is attached to the nut portion 106 of the fitting 100 according to one example of a method 300. According to the method 300, translational movement of the nut 120 is constrained within the nut receptacle 110 between the converging portion 142 of the nut receptacle 110 and the seal 122 by inserting the nut 120 into the nut receptacle 110 and effectually encapsulating the nut 120 therein by non-translatably fixing the seal 122 into place within the annular groove 130 with the nut 120 in the nut receptacle 110. The nut 120 is then translatably moved along the nut receptacle 110 in a first direction, if necessary, until the resilient fingers 123 protrude from the fitting 100.

With the nut 120 constrained between the converging portion 142 and the seal 122, the protruding resilient fingers 123 of the nut 120 are inserted into an aperture 208 of the part 202 at step 302 of the method 300. After resilient fingers 123 of the nut 120 are inserted into the aperture 208 of the part 202, step 304 of the method 300 includes extending or passing the first fastener 132 through the nut 120 to resiliently deform the resilient fingers 123 of the nut 120 away from the central axis 115 of the nut receptacle. In other words, as the first fastener 132 is passed through the nut 120, the first fastener 132 contacts and urges the resilient fingers 123 radially outward from a resting non-biased position (see, e.g., FIG. 5) to a deformed biased position (see, e.g., FIG. 18). In the deformed biased position, the outer peripheral area defined by the resilient fingers 123 is greater than the aperture 208 of the part 202. Accordingly, with the first fastener 132 extended through the nut 120 and the resilient fingers 123 in the deformed biased position, the method 300 includes tightening the first fastener 132, which can be accomplished by rotating the first fastener 132, at step 306 to translationally move the nut 120 along the central axis 115 in a second direction, opposite the first direction, and to urge the teeth 150 of the resilient fingers 123 against the part 202.

In some examples, as shown in FIGS. 17-19, 25, and 26, the fitting assembly 200 further includes a second part 204 and a second fastener 206. The second fastener 206 passes through an aperture 210 in the second part 204 and is secured within the second aperture 112 of the riser portion 108 to attach the second part 204 to the fitting 100. The second fastener 206 is configured to engage the second aperture 112, such as by engaging threads of the second aperture 112 as shown in FIG. 19 or by securing the second fastener 206 with a conventional nut as could be the case with the second aperture 112 of FIG. 22. In FIGS. 17-19, the fitting 100 is attached to only one first part 202. Accordingly, all the nuts 120 of the nut assemblies 104 of the fitting 100 are secured to the same part 202.

However, in FIGS. 23-26, the fitting 100 of the fitting assembly 200 is attached to two first parts 202, which are spaced apart from each other. In other words, the nut portion 106 of the body 102, and more particularly the extender bridge 170 of the nut portion 106, spans from one first part 202 to the other first part 202. One of the first parts 202 is coupled to the first nut-assembly-receptacle set 190 by respective first fasteners 132 and the other of the first parts 202 is coupled to the second nut-assembly-receptacle set 192 by respective first fasteners 132. Also, the riser portion 108 is located between the first parts 202. Therefore, the fitting 100 of FIGS. 23-26 facilitates the attachment of the second part 204 at a location between the first parts 202 or offset from the first parts 202, as opposed to at a location in-line with the first parts 202, such as with the fitting assembly 200 of FIG. 17.

The fitting 100 of the fitting assembly 200 further includes a riser portion 108 in some examples. Additionally, the fitting assembly 200 includes a second part 204 attached to the riser portion 108 by at least one second fastener 206. Each second fastener 206 passes through an aperture 210 formed in the second part 204. Moreover, each second fastener 206 is received within and secured to a second aperture 112 of the riser portion 108.

Figure 23:
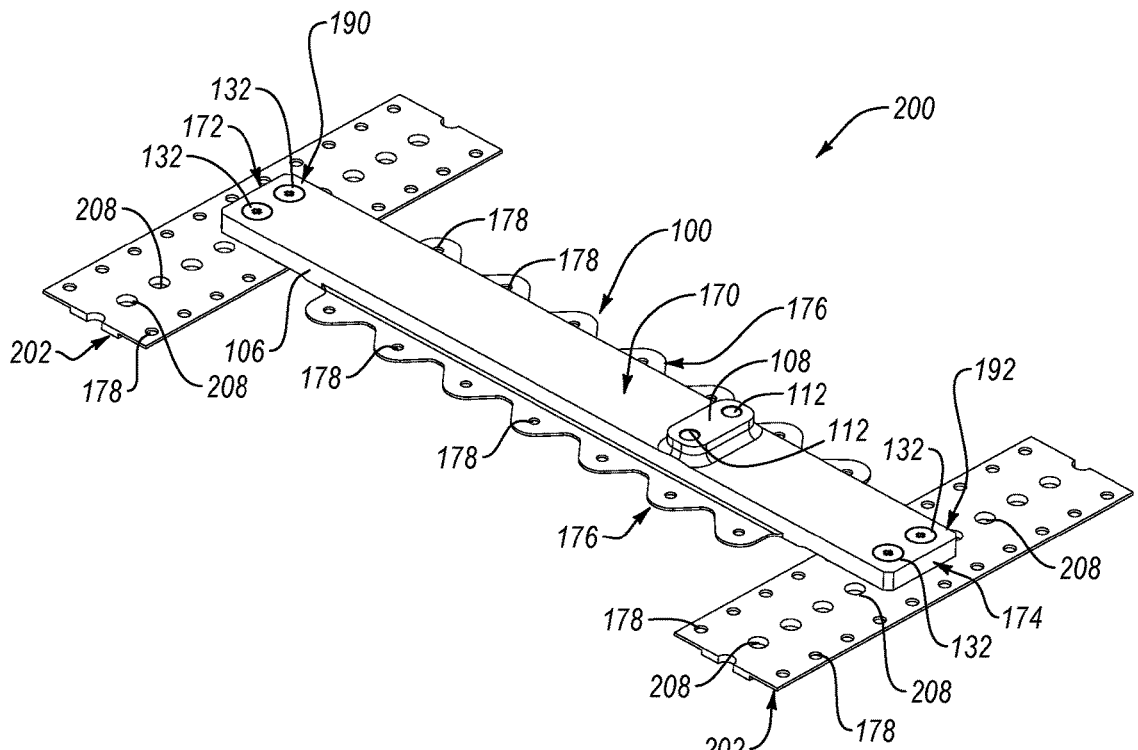
FIG. 23 is a perspective view of a fitting assembly, according to one or more examples of the present disclosure.
Figure 24:
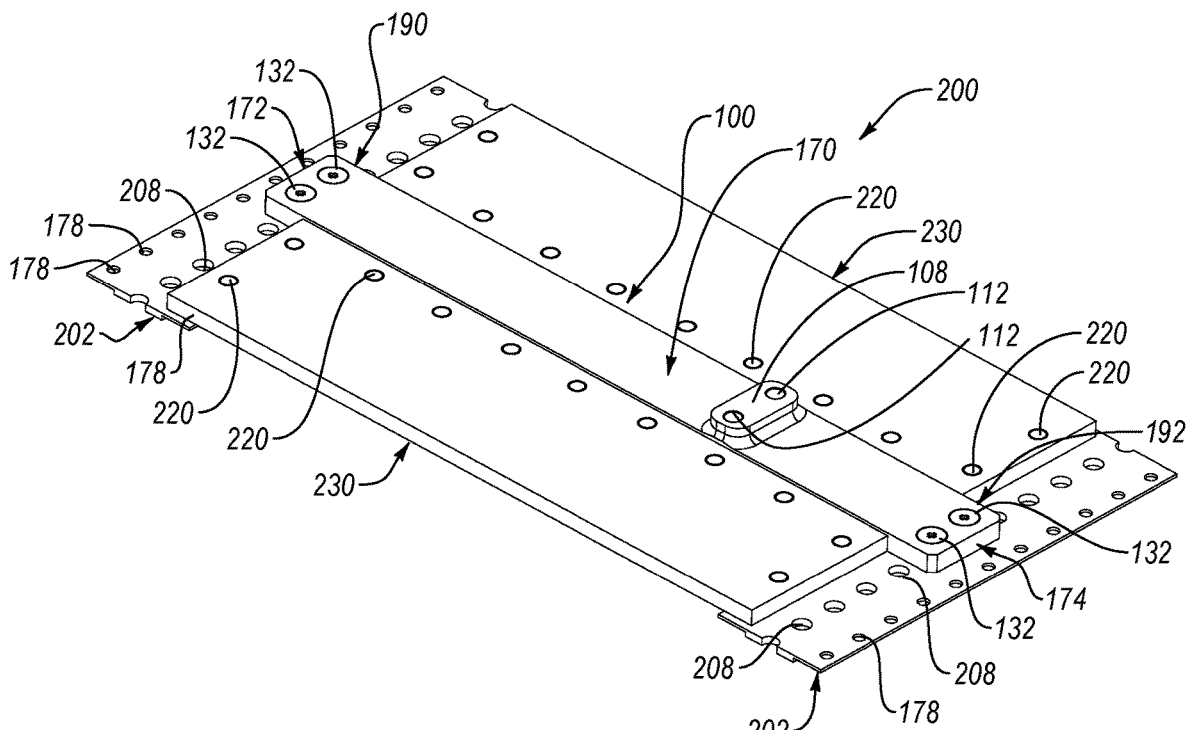
FIG. 24 is a perspective view of a fitting assembly, according to one or more examples of the present disclosure.
Figure 25:
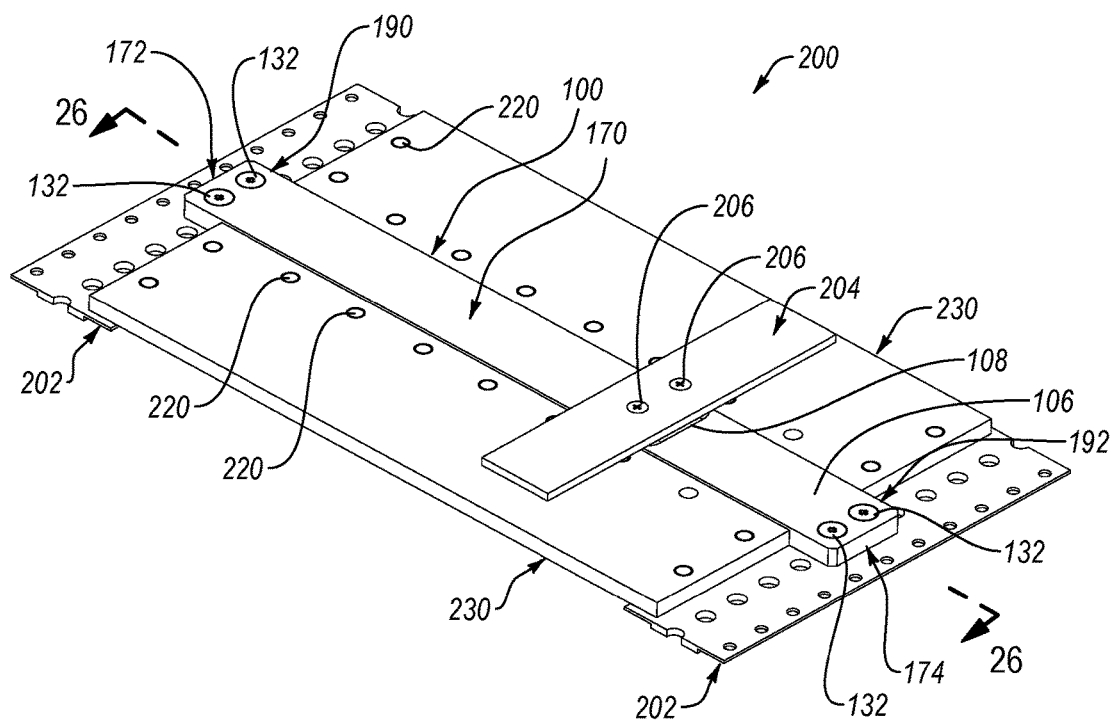
FIG. 25 is a perspective view of a fitting assembly, according to one or more examples of the present disclosure.
Figure 26:
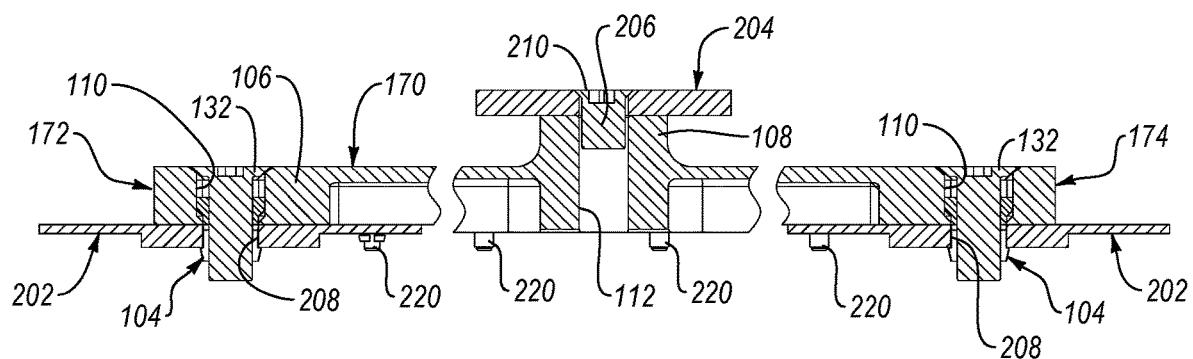
FIG. 26 is a cross-sectional side elevation view of the fitting of FIG. 25, taken along the line 26-26 of FIG. 25, according to one or more examples of the present disclosure.

Referring to FIGS. 23-25, according to some examples, the nut portion 106 of the fitting 100 of the fitting assembly 200 includes flanges 176. Each flange 176 includes a plurality of apertures 178. The fitting assembly 200 further includes a third part 230 coupled to each of the flanges 176 by third fasteners 220. The third fasteners 220 each extend through a corresponding one of multiple apertures formed in the third parts 230 and are secured within a corresponding one of the plurality of apertures 178 formed in the flanges 176. The third parts 230 may also be coupled to respective first parts 202 by additional third fasteners 220 that extend through additional apertures in the third parts 230 and are secured within a corresponding one of a plurality of apertures 178 formed in the first parts 202. Coupling the third parts 230 to both the fitting 100 and the first parts 202 helps to strengthen the fitting assembly 200 and stabilize the third parts 230. To accommodate coupling of various sized and spaced fittings 100 or third parts 230 to the first parts 202, the first parts 202 include a pattern of apertures 178 and apertures 208 spaced apart along a length of the first parts 202.

In some examples, each of the second apertures 112 of the riser portion 108 of the fitting 100 and/or the apertures 178 of the flanges 176 of the fitting 100 can be replaced with a nut receptacle 110 and a seal 122 fixed within the nut receptacle 110. Correspondingly, the second part 204 can be attached to the riser portion 108 and/or the third parts 230 can be attached to the flanges 176 with nuts 120 instead of second fasteners 206 and third fasteners 220. A configuration of this type promotes the attachment of second parts 204 and third parts 230 to the fitting 100 when access to both sides of the parts is impractical.

According to some examples, the first parts 202, the second part 204, and the third parts 230 of the fitting assembly 200 are flat, relatively planar, parts. In a particular example, each of the two first parts (202) is a seat track or rail of an aircraft, the second part 204 is an interior cabin monument component of the aircraft, and each of the third parts 230 is a floor panel of the aircraft. However, in other examples, the first parts, 202, the second part 204, and the third parts 230 can be any of various flat, relatively planar, parts or any of various non-flat, relatively non-planar, parts.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A fitting for attachment to a part, the fitting comprising:
a body comprising a nut portion, wherein the nut portion comprises a nut receptacle having a converging portion and a central axis; and
a nut assembly comprising:
a seal within the nut receptacle, non-translatably fixed relative to the nut receptacle, and spaced apart from the converging portion; and
a nut within the nut receptacle, translatable along the central axis of the nut receptacle, and comprising resilient fingers that are resiliently deformable away from the central axis, wherein translation of the nut along the central axis is constrained by the converging portion and the seal.

2. The fitting according to claim 1, wherein:
the nut portion further comprises a plurality of nut receptacles;
the fitting further comprises a plurality of nut assemblies each corresponding with a respective one of the plurality of nut receptacles; and
the nut portion further comprises an extender bridge between a first nut-assembly-receptacle set, comprising at least two of the plurality of nut receptacles and at least two of the plurality of nut assemblies, and a second nut-assembly-receptacle set, comprising at least two of the plurality of nut receptacles and at least two of the plurality of nut assemblies.

3. The fitting according to claim 2, wherein the body further comprises a riser portion that protrudes from the extender bridge and comprises a second aperture.

4. The fitting according to claim 3, wherein the riser portion is located at a mid-point between the first nut-assembly-receptacle set and the second nut-assembly-receptacle set.

5. The fitting according to claim 3, wherein the riser portion is located closer to the first nut-assembly-receptacle set than the second nut-assembly-receptacle set.

6. The fitting according to claim 2, wherein:
the nut portion further comprises at least one flange protruding from the extender bridge; and
the at least one flange comprises a plurality of apertures.

7. The fitting according to claim 6, wherein an entirety of the nut portion has a one-piece, seamless, monolithic construction.

8. The fitting according to claim 2, wherein:
the body further comprises a riser portion that protrudes from the nut portion and comprises a second aperture; and
the first nut-assembly-receptacle set is between the second nut-assembly-receptacle set and the riser portion.

9. The fitting according to claim 1, wherein:
the nut receptacle further comprises an annular groove; and
the seal has an annular shape and is fitted within the annular groove.

10. The fitting according to claim 9, wherein the seal has a triangular cross-sectional shape.

11. The fitting according to claim 1, wherein:
the nut receptacle further comprises a first anti-rotation feature;
the nut further comprises a second anti-rotation feature; and
engagement between the first anti-rotation feature and the second anti-rotation feature prevents rotation of the nut relative to the nut receptacle and allows translational movement of the nut relative to the nut receptacle.

12. The fitting according to claim 11, wherein:
the nut receptacle has a circular cross-sectional shape;
the first anti-rotation feature comprises a rib extending parallel to the central axis of the nut receptacle; and
the second anti-rotation feature comprises a groove.

13. The fitting according to claim 1, wherein the seal is made of an elastomeric resiliently-flexible material.

14. The fitting according to claim 1, wherein:
the body further comprises a riser portion that protrudes from the nut portion and comprises a second aperture;
the second aperture has a central axis that is parallel with the central axis of the nut receptacle; and
an entirety of the riser portion and the nut portion form a one-piece, seamless, monolithic construction.

15. A fitting assembly, comprising:
a fitting comprising:
a body comprising a nut portion, wherein the nut portion comprises a nut receptacle having a converging portion and a central axis; and
a nut assembly comprising:
a seal within the nut receptacle, non-translatably fixed relative to the nut receptacle, and spaced apart from the converging portion; and
a nut within the nut receptacle and comprising resilient fingers that are resiliently deformable away from the central axis;
at least one first part; and
a first fastener passing through the at least one first part and secured within the nut and causing the resilient fingers to deform away from the central axis, wherein the nut is translatable along the central axis of the nut receptacle, with translation of the nut along the central axis being constrained by the converging portion and the seal, without the first fastener passing through the nut.

16. The fitting assembly according to claim 15, wherein:
the body further comprises a riser portion that protrudes from the nut portion and comprises a second aperture;
the second aperture has a central axis that is parallel with the central axis of the nut receptacle;
an entirety of the riser portion and the nut portion form a one-piece, seamless, monolithic construction;
the fitting assembly further comprises a second part; and
the fitting assembly further comprises a second fastener passing through the second part and secured within the second aperture.

17. The fitting assembly according to claim 16, wherein:
the nut portion further comprises a plurality of nut receptacles;
the fitting further comprises a plurality of nut assemblies each corresponding with a respective one of the plurality of nut receptacles;
the nut portion further comprises an extender bridge between a first nut-assembly-receptacle set, comprising at least two of the plurality of nut receptacles and at least two of the plurality of nut assemblies, and a second nut-assembly-receptacle set, comprising at least two of the plurality of nut receptacles and at least two of the plurality of nut assemblies; and
the fitting assembly further comprises two first parts, spaced apart from each other, wherein one of the first parts is coupled to the first nut-assembly-receptacle set by respective first fasteners and the other of the first parts is coupled to the second nut-assembly-receptacle set by respective first fasteners.

18. The fitting assembly according to claim 17, wherein:
the nut portion further comprises at least one flange protruding from the extender bridge;
the at least one flange comprises a plurality of apertures; and
the fitting assembly further comprises a third part coupled to the at least one flange by third fasteners each extending through the third part and secured within a respective one of the plurality of apertures.

19. The fitting assembly according to claim 18, wherein:
each of the two first parts is a seat track of an aircraft;
the second part is an interior cabin monument component of the aircraft; and
the third part is a floor panel of the aircraft.

20. A method of attaching a fitting to a part, the method comprising:
inserting a nut of a nut assembly of the fitting into an aperture of the part, wherein, when the nut is inserted into the aperture, the nut is translatable along a central axis of a nut receptacle of the fitting with translation of the nut along the central axis being constrained by a converging portion of the nut receptacle and a seal non-translatably fixed within the nut receptacle;
extending a first fastener through the nut to resiliently deform resilient fingers of the nut away from the central axis; and translationally moving the nut along the central axis to urge the resilient fingers against the part.

\* \* \* \* \*